(12) United States Patent
Efland et al.

(10) Patent No.: US 7,920,900 B2
(45) Date of Patent: Apr. 5, 2011

(54) SHARED ANTENNA CONTROL (75) Inventors: Greg H. Efland, Palo Alto, CA (US);
David Fifield, San Jose, CA (US)

(73) Assignee: Broadcom Corporation, Irvine, CA (US)

( * ) Notice: Subject to any disclaimer, the term of this patent is extended or adjusted under 35 U.S.C. 154(b) by 1030 days.

(21) Appl. No.: 11/716,769

(22) Filed: Mar. 12, 2007

(65) Prior Publication Data
US 2007/0218845 A1  Sep. 20, 2007

Related U.S. Application Data (63) Continuation of application No. 10/811,016, filed on Mar. 26, 2004, now Pat. No. 7,190,974.

(51) Int. Cl.
*H04B 1/40* (2006.01)
(52) U.S. Cl. ........................................ 455/562.1; 455/84
(58) Field of Classification Search .................. 455/401, 455/552.1–562.1, 266, 86; 370/335–337, 370/401; 709/228
See application file for complete search history.

(56) References Cited

U.S. PATENT DOCUMENTS

| | | | |
|---|---|---|---|
| 5,881,369 A * | 3/1999 | Dean et al. ...................... | 455/78 |
| 6,034,541 A * | 3/2000 | Kopec et al. ..................... | 326/39 |
| 7,155,252 B2 * | 12/2006 | Martin et al. .............. | 455/553.1 |
| 2002/0059434 A1 * | 5/2002 | Karaoguz et al. ............. | 455/401 |
| 2003/0235167 A1 * | 12/2003 | Kuffner ........................ | 370/335 |
| 2005/0003865 A1 * | 1/2005 | Lastinger et al. .......... | 455/562.1 |
| 2005/0238032 A1 * | 10/2005 | Hesse ........................... | 370/401 |

* cited by examiner

*Primary Examiner* — Kent Chang
*Assistant Examiner* — Kashif Siddiqui
(74) *Attorney, Agent, or Firm* — Garlick Harrison & Markison; Bruce E. Garlick (57) ABSTRACT A scheme for sharing antenna control pins in a wireless communications device implemented on a single CMOS integrated circuit is described. By providing a routing circuit for coupling the antenna control signal to the appropriate transceiver circuitry in a multi-transceiver system, antenna control signals may be efficiently processed using a minimum of pins on the wireless communication device.

23 Claims, 4 Drawing Sheets

SHARED ANTENNA CONTROL

CROSS REFERENCE TO PRIORITY APPLICATION

This application is a continuation of U.S. application Ser. No. 10/811,016, filed Mar. 26, 2004, and now issued as U.S. Pat. No. 7,190,974, which is incorporated herein by reference in its entirety.

BACKGROUND OF THE INVENTION

1. Field of the Invention

The present invention is directed in general to wireless communication systems. In one aspect, the present invention relates to a method and system for efficiently controlling multiple radio transceiver circuits.

2. Related Art

Communication systems are known to support wireless and wire-lined communications between wireless and/or wire-lined communication devices. Such communication systems range from national and/or international cellular telephone systems to the Internet to point-to-point in-home wireless networks. Each type of communication system is constructed, and hence operates, in accordance with one or more communication standards. For instance, wireless communication systems may operate in accordance with one or more standards including, but not limited to, IEEE 802.11, Bluetooth (BT), advanced mobile phone services (AMPS), digital AMPS, global system for mobile communications (GSM), code division multiple access (CDMA), local multi-point distribution systems (LMDS), multi-channel-multi-point distribution systems (MMDS) and/or variations thereof.

Depending on the type of wireless communication system, a wireless communication device (such as a cellular telephone, two-way radio, personal digital assistant (PDA), personal computer (PC), laptop computer, home entertainment equipment, etc.) communicates directly or indirectly with other wireless communication devices. For direct communications (also known as point-to-point communications), the participating wireless communication devices tune their receivers and transmitters to the same channel or channels (e.g., one of the plurality of radio frequency (RF) carriers of the wireless communication system) and communicate over the tuned channel(s). For indirect wireless communications, each wireless communication device communicates directly with an associated base station (e.g., for cellular services) and/or an associated access point (e.g., for an in-home or in-building wireless network) via an assigned channel. To complete a communication connection between the wireless communication devices, the associated base stations and/or associated access points communicate with each other directly, via a system controller, via the public switched telephone network via the Internet, and/or via some other wide area network.

Wireless communication devices typically communicate with one another using a radio transceiver (i.e., receiver and transmitter) that may be incorporated in, or coupled to, the wireless communication device. The transmitter typically includes a data modulation stage, one or more intermediate frequency stages and a power amplifier. The data modulation stage converts raw data into baseband signals in accordance with a particular wireless communication standard. The intermediate frequency stages mix the baseband signals with one or more local oscillations to produce RF signals. The power amplifier amplifies the RF signals prior to transmission via an antenna. In direct conversion transmitters/receivers, conversion directly between baseband signals and RF signals is performed. The receiver is typically coupled to an antenna and includes a low noise amplifier, one or more intermediate frequency stages, a filtering stage and a data recovery stage. The low noise amplifier receives inbound RE signals via the antenna and amplifies them. The intermediate frequency stages mix the amplified RF signals with one or more local oscillations to convert the amplified RF signal into baseband signals or intermediate frequency (IF) signals. The filtering stage filters the baseband signals or the IF signals to attenuate unwanted out of band signals to produce filtered signals. The data recovery stage recovers raw data from the filtered signals in accordance with the particular wireless communication standard.

As the use of wireless communication devices increases, many wireless communication devices will include two or more radio transceivers with two or more antennas, where each radio transceiver is compliant with any of a variety of wireless communication standards may be used with the exemplary communication systems described herein, including Bluetooth, IEEE 802.11(a), (b), (g) and others. For instance, a computer may include two radio transceivers, one for interfacing with an 802.11a wireless local area network (WLAN) device and another for interfacing with an 802.11g WLAN device. In this example, the 802.11g transceiver operates in the 2.4 GHz frequency range and the 802.11a transceiver operates in the 5 GHz frequency range.

Prior attempts to provide such dual band transceiver functionality have used one set of pins or signals to control a first radio transceiver, and a second set of pins or signals to control a second radio transceiver. One drawback associated with this approach is that control signals for both transceivers must be separately generated and applied to the respective transceiver circuits. Another drawback is that circuit power is unnecessarily consumed by operating both transceiver circuits when only one signal can be received or transmitted at a time. Such conventional approaches also require extra pin connections for integrated circuit implementations of a WLAN device, with one set of pins for the first radio transceiver and a second set of pins for the second radio transceiver.

In addition to the complexity of the computational requirements for a communications transceiver such as described above, the ever-increasing need for higher speed communications systems imposes additional performance requirements and resulting costs for communications systems. In order to reduce costs, communications systems are increasingly implemented using Very Large Scale Integration (VLSI) techniques. The level of integration of communications systems is constantly increasing to take advantage of advances in integrated circuit manufacturing technology and the resulting cost reductions. Ibis means that communications systems of higher and higher complexity are being implemented in a smaller and smaller number of integrated circuits. For reasons of cost and density of integration, the preferred technology is CMOS. To this end, digital signal processing ("DSP") techniques generally allow higher levels of complexity and easier scaling to finer geometry technologies than analog techniques, as well as superior testability and manufacturability.

Therefore, a need exists for a method and apparatus that provides for improved radio transceiver control functions for coordinating the reception and transmission of signals in wireless communication devices. In addition, a need exists for a more efficient control of antenna switching functions among multiple radio transceiver circuits. There is also a need for a better system that is capable of performing the above functions and overcoming these difficulties using circuitry implemented in integrated circuit form. Further limitations and disadvantages of conventional systems will become apparent to one of skill in the art after reviewing the remainder of the present application with reference to the drawings and detailed description which follow.

SUMMARY OF THE INVENTION

The present invention is directed to apparatus and methods of operation that are further described in the following Brief Description of the Drawings, the Detailed Description, and the Claims. Other features and advantages of the present invention will become apparent from the following detailed description of the invention made with reference to the accompanying drawings.

DETAILED DESCRIPTION

A method and apparatus for an improved wireless communication system is described. While various details are set forth in the following description, it will be appreciated that the present invention may be practiced without these specific details. For example, selected aspects are shown in block diagram form rather than in detail, in order to avoid obscuring the present invention. Some portions of the detailed descriptions provided herein are presented in terms of algorithms or operations on data within a computer memory. Such descriptions and representations are used by those skilled in the field of communication systems to describe and convey the substance of their work to others skilled in the art. In general, an algorithm refers to a self-consistent sequence of steps leading to a desired result, where a "step" refers to a, manipulation of physical quantities which may, though need not necessarily take the form of electrical or magnetic signals capable of being stored, transferred, combined, compared, and otherwise manipulated. It is common usage to refer to these signals as bits, values, elements, symbols, characters, terms, numbers, or the like. These and similar terms may be associated with the appropriate physical quantities and are merely convenient labels applied to these quantities. Unless specifically stated otherwise as apparent from the following discussion, it is appreciated that throughout the description, discussions using terms such as processing, computing, calculating, determining, displaying or the like, refer to the action and processes of a computer system, or similar electronic computing device, that manipulates and/or transforms data represented as physical, electronic and/or magnetic quantities within the computer system's registers and memories into other data similarly represented as physical quantities within the computer system memories or registers or other such information storage, transmission or display devices.

Figure 1:
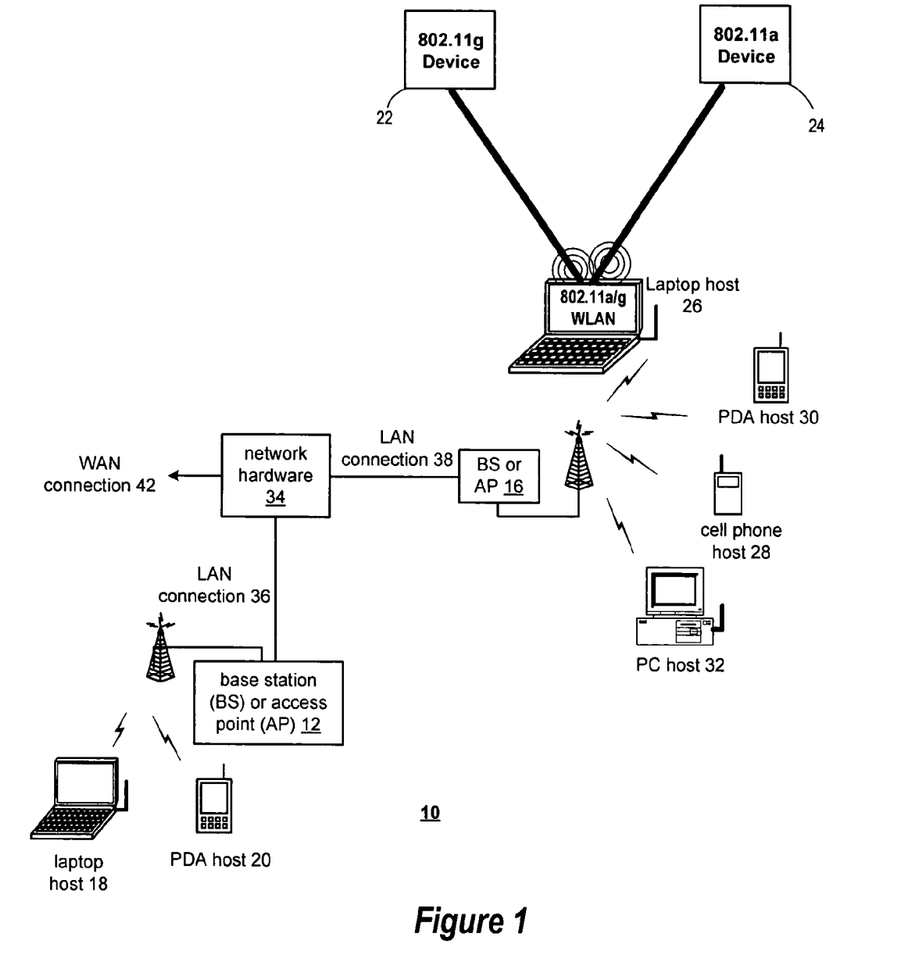
FIG. 1 is a schematic block diagram of a wireless communication system in accordance with the present invention.

FIG. 1 illustrates a wireless communication system 10 in which embodiments of the present invention may operate. As illustrated, the wireless communication system 10 includes a plurality of base stations and/or access points 12, 16, a plurality of wireless communication devices 18-32 and a network hardware component 34. The wireless communication devices 18-32 may be laptop host computers 18 and 26, personal digital assistant hosts 20 and 30, personal computer hosts 32, cellular telephone hosts 28, an 802.11a WLAN device 22 and/or an 802.11g WLAN device 24. The details of the wireless communication devices will be described in greater detail with reference to FIGS. 2-4.

As illustrated, the base stations or access points 12, 16 are operably coupled to the network hardware 34 via local area network connections 36, 38. The network hardware 34 (which may be a router, switch, bridge, modem, system controller, etc.) provides a wide area network connection 42 for the communication system 10. Each of the base stations or access points 12, 16 has an associated antenna or antenna array to communicate with the wireless communication devices in its area. Typically, the wireless communication devices register with a particular base station or access point 12, 16 to receive services from the communication system 10. For direct connections (i.e., point-to-point communications), wireless communication devices communicate directly via an allocated channel. Regardless of the particular type of communication system, each wireless communication device includes a built-in radio and/or is coupled to a radio. The radio includes a highly linear amplifier and/or programmable multi-stage amplifier as disclosed herein to enhance performance, reduce costs, reduce size, and/or enhance broadband applications.

Figure 2:
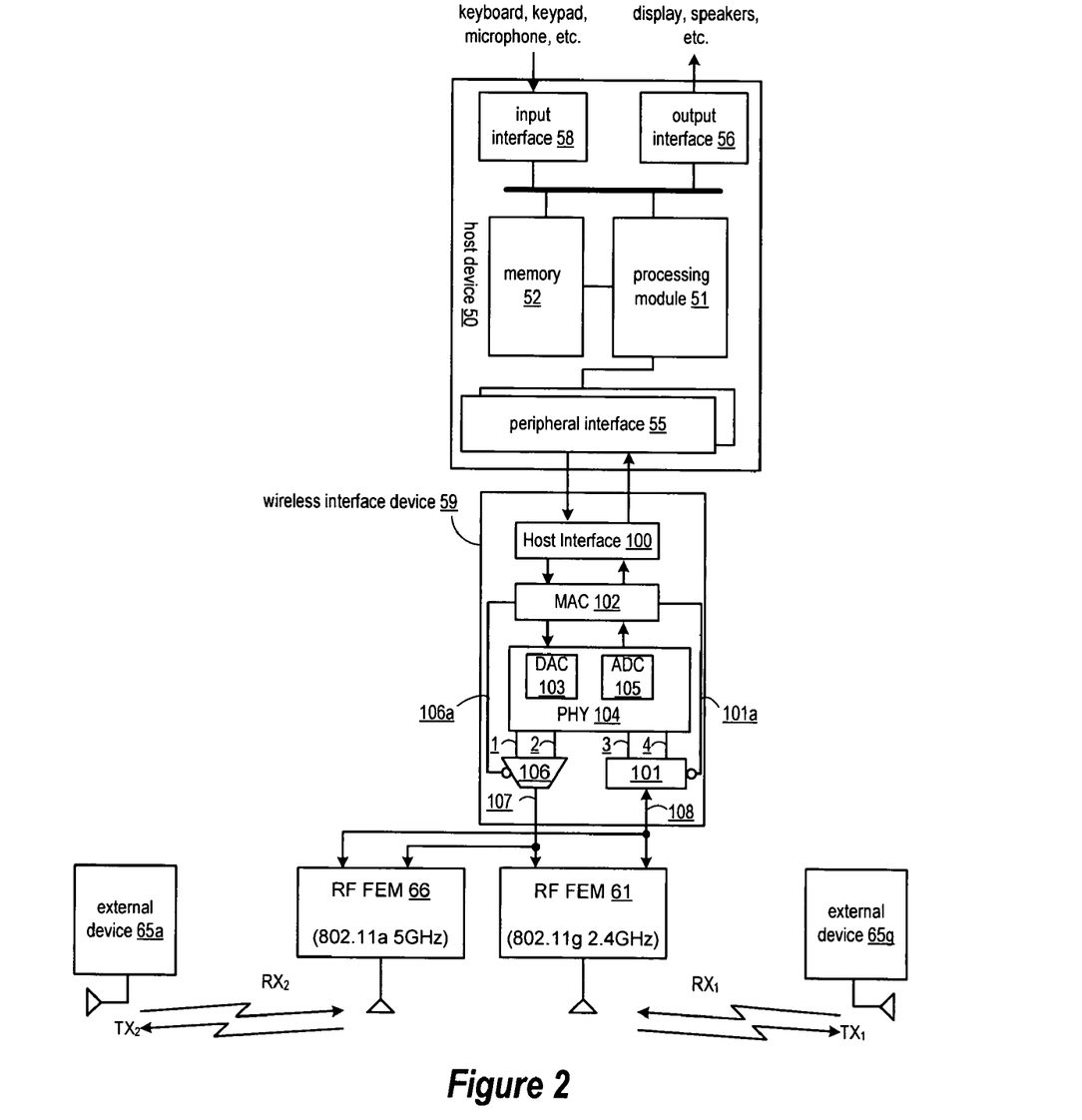
FIG. 2 is a schematic block diagram of a wireless communication device in accordance with the present invention.

FIG. 2 is a schematic block diagram illustrating a radio implemented in a wireless communication device that includes the host device or module 50 and at least one wireless interface device, or radio transceiver 59. The wireless interface device may be built in components of the host device 50 or externally coupled components. As illustrated, the host device 50 includes a processing module 51, memory 52, peripheral interface 55, input interface 58 and output interface 56. The processing module 51 and memory 52 execute the corresponding instructions that are typically done by the host device. For example, in a cellular telephone device, the processing module 51 performs the corresponding communication functions in accordance with a particular cellular telephone standard. For data received from the wireless interface device 59 (e.g. inbound data), the peripheral interface 55 provides the data to the processing module 51 for further processing and/or routing to the output interface 56. The output interface 56 provides connectivity to an output display device such as a display, monitor, speakers, etc., such that the received data may be displayed. The peripheral interface 55 also provides data from the processing module 51 to the wireless interface device 59. The processing module 51 may receive the outbound data from an input device such as a keyboard, keypad, microphone. etc. via the input interface 58 or generate the data itself. For data received via the input interface 58, the processing module 51 may perform a corresponding host function on the data and/or route it to a wireless interface device 59 via the peripheral interface 55.

The wireless interface device 59 includes a host interface 100, a media-specific access control protocol (MAC) layer module 102, a physical layer module (PHY) 104, a digital-to-analog converter (DAC) 103, and an analog to digital converter (ADC) 105. Typically, transmit data coming from the host device 50 is presented to the MAC 102, which in turn presents it to the PHY 104. The PHY 104 processes the transmit data (scrambling, encoding, modulation, etc.) and then hands its output to the DAC 103 for conversion to an analog signal. The DAC output is then gained and filtered and passed to the antenna section 61 or 66 by way of the transmit signal path in line 108 using a routing or selection circuit 101 which acts to multiplex the actual transmit and receive (baseband analog) signals 3, 4 to a single signal 108 under control of a selection signal 101*a*. In addition, a selection circuit 106 is used to route two sets of antenna switch controls 1, 2 that are provided by the PHY 104 over a single output 107 (which may be a shared set of output pins or wires) under control of a selection signal 106*a*. The selection signal for selection circuit 101 (101*a*) and for selection circuit 106 (106*a*) may be generated by the MAC module 102. Depending upon the selection signal 106*a* provided by software, one of these controls 1,2 is output by the selection circuit 106 over a single set of pins/wires to control the antenna switches of both RF subsystems 61, 66. On the receive side, the antenna section (61 or 66) output is gained and filtered, then passed by way of the receive signal path in line 108 to an ADC 105 for conversion to a digital signal. This digital signal is processed (demapped, decoded, descrambled, etc.) by the PHY 104 and the bits are passed through the MAC 102 to the host 50 for delivery to the output interface 56. As will be appreciated, the modules in the wireless interface device are implemented with a communications processor and an associated memory for storing and executing instructions that control the access to the physical transmission medium in the wireless network.

In addition to a first radio transceiver circuit and RF front end 61 (that may or may not be integrated on a common substrate with the wireless interface 59), a second radio transceiver circuit and RF front end 66 is provided and coupled to the wireless interface device 59. For example, the first radio transceiver circuit and RF front end circuit 61 transforms baseband data into a 2.4 GHz signal in accordance with the 802.11g standard, while the second radio transceiver circuit and RF front end circuit 66 transforms baseband data into a 5 GHz signal in accordance with the 802.11a standard. With two separate radio transceiver circuits coupled to a wireless interface device 59, a single set of antenna switch control pins or wires 107 is used for connecting the antenna switch control signals 1, 2 with the transceiver circuits 61, 66 by using a multiplexer or selection circuit 106 to route the transceiver control signals 1, 2 to the appropriate transceiver circuit. For example, instead of having the wireless interface device 59 provide separate antenna switch control signals (and their attendant pin overhead for the device 59), the multiplexing of antenna control signals 1, 2 into a single set of pins/wires 107 (which are connected in parallel to both sets of antenna switches in the transceiver circuits 61, 66) reduces the pin count and overhead for the wireless interface device 59 without sacrificing performance.

Each external device (e.g., 65*a*, 65*g*) includes its own wireless interface device for communicating with the wireless interface device of the host device. For example, the host device may be personal or laptop computer and the external devices 65 may be a headset, personal digital assistant, cellular telephone, printer, fax machine, joystick, keyboard, desktop telephone, or access point of a wireless local area network. In this example, external device 65*a* is an IEEE 802.11a wireless interface device and external device 65*g* is an IEEE 802.11g wireless interface device.

In operation, interference between communications with external devices 65*a*, 65*g* is avoided where the external devices operating in different frequency ranges are prioritized or sequenced. As a result, when transmission or reception is occurring with a first external device (e.g., 65*a*), the radio transceiver circuit 61 for the second external device 65*g* is disabled and the antenna switch control signal. (e.g., 1) for external device 65*a* is routed to the radio transceiver circuit 66 via multiplexer 106 under control of the selection signal 106*a*. Conversely, when transmission or reception is occurring with the second eternal device (e.g., 65*g*), the radio transceiver circuit 66 for the first external device 65*g* is disabled and the antenna switch control signal (e.g., 2) for external device 65*g* is routed to the radio transceiver circuit 61. The methods by which the MAC and/or PHY layer modules detect, adjust and/or route the antenna switch control signals 1, 2 may be executed by the processing module(s) and other transceiver module(s) included in the wireless interface device 59, or may alternatively be executed by the processing functionality in the host device 50.

Figure 3:
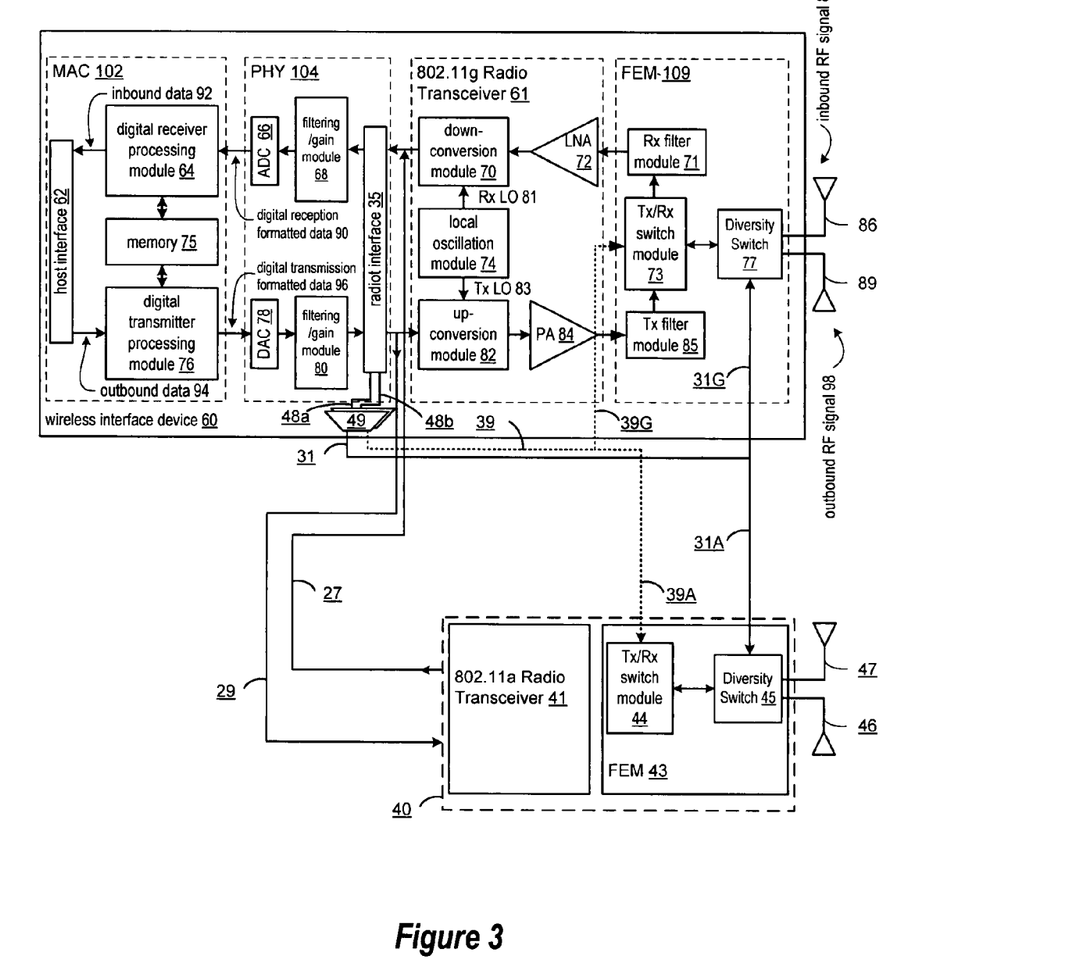
FIG. 3 is a schematic block diagram of a wireless interface device in accordance with the present invention.

FIG. 3 is a schematic block diagram of a wireless interface device (i.e., a radio) 60 which includes a host interface 62, digital receiver processing module 64, an analog-to-digital converter (ADC) 66, a filtering/gain module 68, an down-conversion stage 70, a receiver filter 71, a low noise amplifier 72, a transmitter/receiver switch 73, a local oscillation module 74, memory 75, a digital transmitter processing module 76, a digital-to-analog converter (DAC) 78, a filtering/gain module 80, an mixing up-conversion stage 82, a power amplifier 84, a transmitter filter module 85 and a diversity switch 77. The transmitter/receiver switch 73 is coupled to the diversity switch 77 through which two antennas 86, 89 are coupled to the wireless interface device. As will be appreciated, the antennas 86, 89 may be polarized antennas, directional antennas and/or may be physically separated to provide a minimal amount of interference. In addition, either antenna 86, 89 may be used for either transmitting or receiving signals, depending on the switching specified by the transmit/receive switch 73. As illustrated, the transmitter/receiver switch 73 and diversity switch 77 selectively couple one of the antennas 86, 89 to the transmit/receive switch 73 in response to a diversity switching control signal 31G that is provided by the PHY module 104. In addition, a transmit/receive switching control signal 39G may be provided by the PHY module 104 to the transmit/receive switch module 73. In a selected embodiment, the wireless interface device 60 uses the transceiver and antenna section (86, 89, 77, 73, 71, 72, 70, 74, 82, 84, 85) to receive and transmit signals in accordance with a first signaling protocol (e.g., IEEE 802.11g) under control of the PHY module 104.

To provide dual band communications, the wireless interface device 60 may be coupled to a, second transceiver and antenna section 40 to receive and transmit signals in accordance with a second signaling protocol. (e.g., IEEE 802.11a). As illustrated, transceiver and antenna section 40 includes a radio transceiver circuit 41 and front end modulator 43 for receiving and transmitting 802.11a signals, in this example. The front end modulator section may be constructed of a transmitter/receiver switch 44 and a diversity switch 45 for selectively coupling one of the antennas 46, 47 to the transmit/receive switch 44 in response to a diversity switching control signal 31A that is provided by the PHY module 104. In addition, a transmit/receive switching control signal 39A may be provided by the PHY module 104 to the transmit/receive switch module 44.

The above described antenna switch control signals are provided as a single output pin or wire from the PHY 104 by use of a multiplexing circuit 49. In particular, the diversity switch control signals 31A and 31G are provided as a single output from the multiplexer 49, which selects from the diversity switch control signals 48*a*, 48*b* under control of a multiplexer selection signal (not shown). Other control signals for the radio transceiver subsystems may also be provided by a single set of output wires or pins. For example and as indicated with the dashed lines, the transmit/receive switch control signals 39A and 39G may be provided as a single output from the multiplexer 49, which selects from the transmit/receive switch control signals 48a, 48b under control of a multiplexer selection signal (not shown). Other configurations of transmit/receive and diversity switches are possible, such as using a bridge configuration which directly implements the combined functions. In addition, each RF subsystem can be different in which case the appropriate encoding of switch controls is used according to the active subsystem.

The digital receiver processing module 64, the digital transmitter processing module 76 and the memory 75 execute digital receiver functions and digital transmitter functions in accordance with a particular wireless communication standard. The digital receiver functions include, but are not limited to, digital baseband frequency conversion, demodulation, constellation demapping, decoding and/or descrambling. The digital transmitter functions include, but are not limited to, scrambling, encoding, constellation mapping modulation and/or digital baseband frequency conversion. The digital receiver and transmitter processing modules 64, 76 may be implemented using a shared processing device, individual processing devices, or a plurality of processing devices. Such a processing device may be a microprocessor, micro-controller, digital signal processor, microcomputer, central processing unit field programmable gate array, programmable logic device, state machine, logic circuitry analog circuitry, digital circuitry and/or any device that manipulates signals (analog and/or digital) based on operational instructions. The memory 75 may be a single memory device or a plurality of memory devices. Such a memory device may be a read-only memory, random access memory, volatile memory, non-volatile memory, static memory, dynamic memory, flash memory, and/or any device that stores digital information. Note that when the processing module 64, 76 implements one or more of its functions via a state machine, analog circuitry, digital circuitry and/or logic circuitry, the memory storing the corresponding operational instructions may be embedded with the circuitry comprising the state machine, analog circuitry, digital circuitry and/or logic circuitry.

In operation, the wireless interface device 60 receives outbound data 94 from the host device via the host interface 62. The host interface 62 routes the outbound data 94 to the digital transmitter processing module 76, which processes the outbound data 94 to produce digital transmission formatted data 96 in accordance with a particular wireless communication standard, such as IEEE 802.11 (including all current and future subsections), Bluetooth, etc. The digital transmission formatted data 96 will be a digital base-band signal or a digital low IF signal, where the low IF typically will be in the frequency range of one hundred kilohertz to a flew megahertz. Subsequent stages convert the digital transmission formatted data to an RF signal using a PHY module 104 and radio transmission circuitry, and may be implemented as follows. The digital-to-analog converter 78 converts the digital transmission formatted data 96 from the digital domain to the analog domain. The filtering/gain module 80 filters and/or adjusts the gain of the analog signal prior to providing it to the radio interface module 35. For transmission in accordance with a first signaling protocol (e.g., IEEE 802.11g), the radio interface module 35 provides the filtered/adjusted analog signal to the up-conversion module 82. The mixing stage 82 directly converts the analog baseband or low IF signal into an RF signal based on a transmitter local oscillation clock 83 provided by local oscillation module 74. The power amplifier 84 amplifies the RF signal to produce outbound RF signal 98, which is filtered by the transmitter filter module 85. Antenna switching control signals 39G, 31G provided to the transmit/receive switch module 73 and diversity switch module 77 route the outbound RF signal 98 for transmission to a targeted device such as a base station, an access point and/or another wireless communication device via a selected antenna 86, 89.

In accordance with a selected embodiment whereby a signal is to be transmitted in accordance with a second signaling protocol (e.g., IEEE 802.11a), the radio interface module 35 provides the filtered/adjusted analog signal 29 to the second transceiver and antenna section 40. As described herein, the actual transmit and receive (baseband analog) signals may be multiplexed between a first radio transceiver 61 and second radio transceiver 41 over a shared pin set using mux selection signals generated by the MAC module. (See selection circuit 101 in FIG. 2.) In addition to providing the filtered/adjusted analog signal 29 to the radio transceiver 41, antenna switching control signals 39A, 31A are provided to the transmit/receive switch module 44 and diversity switch module 45, which route the outbound RF signal from transceiver 41 for transmission to a targeted device such as a base station, an access point and/or another wireless communication device via a selected antenna 46, 47.

As illustrated in FIG. 3, the diversity switch control signals 31A, 31G are provided from a single set of output pins or wires 31 from the wireless interface device 60. This is made possible by including a signal selection circuit 49 for routing the appropriate diversity switch control signals 48a, 48b to the appropriate transceiver subsystem. The same technique can be used for other signals provided to the radio transceiver and FEM subsystems. For example, FIG. 3 shows that a single transmit/receive switch control signal 39 is coupled in parallel to the transmit/receive switch modules 44, 73 by using the signal selection circuit 49 to route the appropriate transmit/receive switch control signals 48, 48b.

In accordance with a selected embodiment whereby a signal is to be received in accordance with a first signaling protocol (e.g., IEEE 802.11g), the wireless interface device 60 receives an inbound RF signal 88 from an antenna (e.g., 86) via antenna switch module(s) 73, 77, which was transmitted by a base station, an access point or another wireless communication device. The inbound RF signal is converted into digital reception formatted data, either directly or through an intermediate frequency conversion process which may be implemented as follows. The diversity switch module 77 and transmit/receive switch module 73 provide the inbound RF signal 88 to the receiver filter module 71, where the receiver filter 71 bandpass filters the inbound RF signal 88. The receiver filter 71 provides the filtered RF signal to low noise amplifier 72, which amplifies the signal 88 to produce an amplified inbound RF signal. The low noise amplifier 72 provides the amplified inbound RF signal to the mixing module 70, which directly converts the amplified inbound RF signal into an inbound low IF signal or baseband signal based on a receiver local oscillation clock 81 provided by local oscillation module 74. The down conversion module 70 provides the inbound low IF signal or baseband signal to the filtering/gain module 68 via the radio interface 35. The filtering/gain module 68 filters and/or gains the inbound low IF signal or the inbound baseband signal to produce a filtered inbound signal. The analog-to-digital converter 66 converts the filtered inbound signal from the analog domain to the digital domain to produce digital reception formatted data 90. The digital receiver processing module 64 decodes, descrambles, demaps, and/or demodulates the digital reception formatted data 90 to recapture inbound data 92 in accordance with the particular wireless communication standard being implemented by wireless interface device. The host interface 62 provides the recaptured inbound data 92 to the host device (e.g., 50) via the peripheral interface (e.g., 55).

In accordance with a selected embodiment whereby a signal is to be received in accordance with a second signaling protocol (e.g., IEEE 802.11a), the radio interface module 35 receives the inbound low IF signal or baseband signal 27 from the second transceiver and antenna section 40. In addition to receiving the inbound low IF signal or baseband signal 27 from the radio transceiver 41, the radio interface 35 provides antenna switching control signals 39A, 31A to the transmit/receive switch module 44 and diversity switch module 45, which route the inbound RF signal from a targeted device via selected antenna 46, 47. Again, these control signals are provided from a common or shared device output. For example, the diversity switch control signal 31 is shared by the diversity switches 77, 45 which are coupled in parallel by lines 31G, 31A, respectively.

By distributing a antenna switching control signals 48a, 48b through a single set of output pines or wires (e.g., 31) from the radio interface 35 to the antenna sections of the first and second radio transceiver sections using a multiplexer or selection circuit 49, the overall pin count requirements for the wireless interface device 60 may be reduced. For example, instead of having one group of control pins on the wireless interface device 60 for controlling the diversity switch 77 in the first transceiver circuit 61, and another group of control pins on the wireless interface device 60 for controlling the diversity switch 45 in the second transceiver circuit 40, the present invention uses a single group of control pins 31 on the wireless interface device 60 for controlling both diversity switches 77, 45 by multiplexing the control signals 48a, 48b issued by the PHY module 104 through a selection circuit 49. The shared antenna control protocol does not affect the performance of a second transceiver circuit (e.g., 802.11a transceiver 40) when the first transceiver circuit (e.g., 802.11g transceiver 61) is active where the second transceiver circuit is disabled during transmit/receive operations of the first transceiver circuit. In a selected embodiment, the PHY module 104 provides the shared antenna control signals 48a, 48b through a selection circuit 49 to a single set of output pins 39 under control of the software operations that configure the system for transmit/receive operations under either a first protocol (e.g., the 802.11g protocol, whereby the second transceiver and antenna section 40 is disabled) or a second protocol (e.g., the 802.11a protocol, whereby the first transceiver and antenna section 61 is disabled).

As will be appreciated, the wireless communication device described herein may be implemented using one or more integrated circuits. For example, the host device 50 may be implemented on one integrated circuit, the digital receiver processing module 64, the digital transmitter processing module 76 and memory 75 may be implemented on a second integrated circuit, the remaining components of the wireless interface device 60 may be implemented on a third integrated circuit and the second transceiver and antenna section 40 may be implemented in a fourth integrated circuit. Alternatively, the MAC 102, PHY 104 and radio transceiver 61 may be implemented as one integrated circuit, the FEM 109 may be implemented as a second integrated circuit and the second transceiver and antenna section 40 may be implemented as a third integrated circuit. As another alternate example, the wireless interface device 60 may be implemented on a first integrated circuit and the second transceiver and antenna section 40 may be implemented in a second integrated circuit. As yet another example, the wireless interface device 60 and the second transceiver and antenna section 40 may be implemented in a single integrated circuit. In addition, the processing module 51 of the host device and the digital receiver and transmitter processing modules 64 and 76 may be a common processing device implemented on a single integrated circuit. Further, the memory 52 and memory 75 may be implemented on a single integrated circuit and/or on the same integrated circuit as the common processing modules of processing module 51 and the digital receiver and transmitter processing module 64 and 76.

In a selected embodiment, the present invention shows, for the first time, a fully integrated, single chip 802.11b/g solution with connectivity in the 2.4 GHz band, and with built-in support for 802.11a connectivity in the 5 GHz band, all implemented in CMOS (Complementary Metal Oxide Semiconductor), as part of a single chip or multi-chip transceiver radio using shared antenna control pins. The present invention enables wireless communication devices (such as a WLAN device) to communicate with other wireless devices by controlling multiple transceiver circuits (and their associated antenna switching circuitry) with a shared control signal when priority as between the competing WLAN devices has been allocated.

Figure 4:
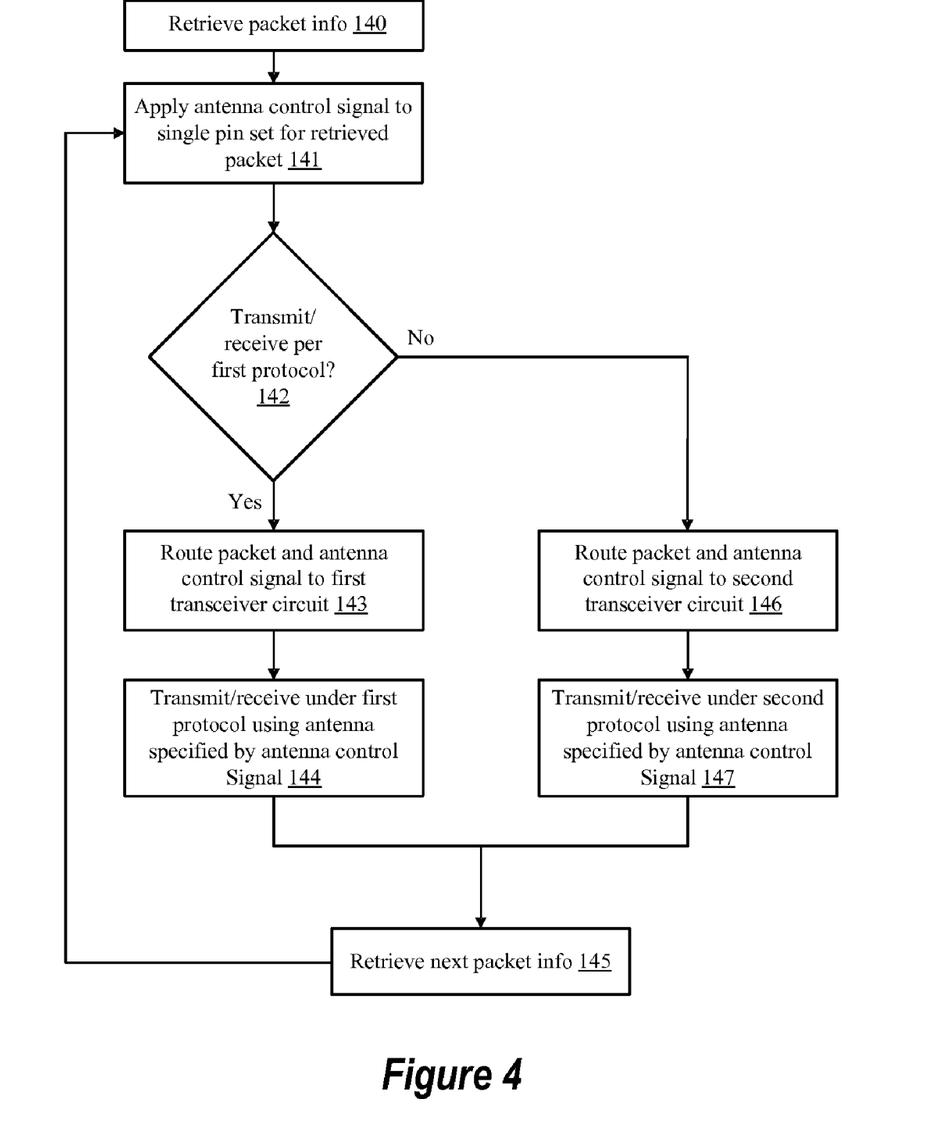
FIG. 4 is a logic diagram of a method for sharing antenna control signals between wireless interface devices in accordance with the present invention.

Turning now to FIG. 4, a method for controlling wireless communications with a plurality of external wireless devices is illustrated. The method begins at step 140, where packet information for the signal to be received or transmitted is retrieved. For example, a wireless interface device (e.g., 60) that is to transmit information retrieves packet data for the information from a host processor. To direct the transmission of the packet over a particular antenna, an antenna control signal is applied (step 141) to a predetermined pin set for the wireless interface device (e.g., 60). As described herein, this same pin set on the wireless interface device 60 is used for providing antenna control signals to both antenna sections whether the transmission/reception is to be made by the first (e.g., 802.11g) transceiver or the second (e.g., 802.11a) transceiver.

At decision 142, it is determined which protocol is to be used for transmitting/receiving the packet. In a selected embodiment this decision may be made by the PHY module 104. If a first protocol (e.g., 802.11g) is to be used ("yes" outcome from decision 142), the packet and antenna control signal are routed to the appropriate transceiver circuit (e.g., first transceiver circuit 61) at step 143. For example, a radio interface module 35 in the PHY module 104 selects one of the antenna switching control signal 48a, 48b for output to the first transceiver circuit with selection circuit 49, as illustrated in FIG. 3 with control line 31, 311G for the first diversity switch module 77. This same selection circuit is used to route the other of the antenna switching control signal 48a, 48b for output to the second transceiver circuit when it is to be used for transmitting or receiving data. Thus, the shared control lines (e.g., 31) specify a particular antenna (e.g., 86, 89) over which the transmit/receive operation is to occur in the first transceiver circuit 61 using the first protocol (step 144).

On the other hand, if it is determined at decision 142 that a second protocol (e.g., 802.11a) is to be used ("no" outcome from decision 142), the packet and antenna control signal are routed to the other transceiver circuit (e.g., second transceiver circuit 40) at step 146. For example a radio interface module 35 in the PHY module 104 selects one of the antenna switching control signal 48a, 48b for output to the second transceiver circuit with selection circuit 49, as illustrated in FIG. 3 with control line 31, 31A for the second diversity switch module 45. Thus, the shared control lines (e.g., 31) specify a particular antenna (e.g., 46, 47) over which the transmit/receive operation is to occur in the second transceiver circuit 40 using the second protocol (step 147).

Upon completion of the transmission or reception of the packet, information for the next packet is retrieved (step 145) and the next antenna control signal for that packet is obtained from the single pin set (step 141). In this way, a single pin set on the wireless interface device 60 may be used to control antenna selection, regardless of which antenna group or signaling protocol is used.

As described herein and claimed below, a method and apparatus are provided for sharing selected transceiver control pins in a dual band wireless communication device. As will be appreciated, the present invention may be implemented in a computer accessible medium including one or more data structures representative of the circuitry included in the system described herein. Generally speaking, a computer accessible medium may include storage media such as magnetic or optical media, e.g., disk, CD-ROM, or DVD-ROM, volatile or non-volatile memory media such as RAM (e.g., SDRAM, RDRAM, SRAM, etc.), ROM, PROM, EPROM, EEPROM, etc., as well as media accessible via transmission media or signals such as electrical, electromagnetic, or digital signals, conveyed via a communication: medium such as a network and/or a wireless link. For example, data structure(s) of the circuitry on the computer accessible medium may be read by a program and used, directly or indirectly, to implement the hardware comprising the circuitry described herein. For example, the data structure(s) may include one or more behavioral-level descriptions or register-transfer level (RTL) descriptions of the hardware functionality in a high level design language (IDL) such as Verilog or VHDL. The description(s) may be read by a synthesis tool which may synthesize the description to produce one or more netlist(s) comprising lists of gates from a synthesis library. The netlist(s) comprise a set of gates which also represent the functionality of the hardware comprising the circuitry. The netlist(s) may then be placed and routed to produce one or more data set(s) describing geometric shapes to be applied to masks. The masks may then be used in various semiconductor fabrication steps to produce a semiconductor circuit or circuits corresponding to the circuitry. Alternatively, the data structure(s) on computer accessible medium may be the netlist(s) (with or without the synthesis library) or the data set(s), as desired. In yet another alternative, the data structures may comprise the output of a schematic program, or netlist(s) or data set(s) derived therefrom. While a computer accessible medium may include a representation of the present invention, other embodiments may include a representation of any portion of the wireless communication device, transceiver circuitry and or processing modules contained therein.

While the system and method of the present invention has been described in connection with the preferred embodiment it is not intended to limit the invention to the particular form set forth, but on the contrary, is intended to cover such alternatives, modifications and equivalents as may be included within the spirit and scope of the invention as defined by the appended claims so that those skilled in the art should understand that they can make various changes, substitutions and alterations without departing from the spirit and scope of the invention in its broadest form.

What is claimed is:

1. A wireless communication device comprising:
   first wireless transceiver circuitry;
   second wireless transceiver circuitry;
   wireless interface device circuitry coupled to the first wireless transceiver circuitry and to the second wireless transceiver circuitry, the wireless interface device circuitry servicing both the first wireless transceiver circuitry and the second wireless transceiver circuitry, said servicing including producing combined control signals for the first wireless transceiver circuitry and the second wireless transceiver circuitry; and
   combined control signal routing circuitry coupled to the wireless interface device circuitry, the first wireless transceiver circuitry, and the second wireless transceiver circuitry, the combined control signal routing circuitry controlled by the wireless interface device circuitry to perform a first routing of the combined control signals to the first wireless transceiver circuitry in a first operating condition and to perform a second routing of the combined control signals to the second wireless transceiver circuitry in a second operating condition, wherein the first operating condition differs from the second operating condition.

2. The wireless communication device of claim 1, further comprising the combined control signal routing circuitry controlled by the wireless interface device to route the combined control signals to both the first wireless transceiver circuitry and to the second wireless transceiver circuitry during a third operating condition, wherein the third operating condition differs from the first operating condition and the second operating condition.

3. The wireless communication device of claim 2, wherein:
   the first operating condition comprises the first wireless transceiver circuitry servicing communications and the second wireless transceiver circuitry idle;
   the second operating condition comprises the second wireless transceiver circuitry servicing communications and the first wireless transceiver circuitry idle; and
   the third operating condition comprises the first wireless transceiver circuitry and the second wireless transceiver circuitry simultaneously servicing communications.

4. The wireless communication device of claim 1, further comprising:
   first antenna diversity circuitry coupled to the first wireless transceiver circuit;
   second antenna diversity circuitry coupled to the second wireless transceiver circuit; and
   the combined control signal routing circuitry controlled by the wireless interface device circuitry to route diversity switching control signals to both the first antenna diversity circuitry and to the second antenna diversity circuitry.

5. The wireless communication device of claim 1, further comprising:
   first antenna diversity circuitry coupled to the first wireless transceiver circuitry;
   first and second antennas coupled to the first antenna diversity circuitry; and
   the combined control signal routing circuitry controlled by the wireless interface device circuitry to route diversity switching control signals to the first antenna diversity circuitry to initiate diversity in the transmission or receipt of wireless communications serviced by the first wireless transceiver circuitry.

6. The wireless communication device of claim 1, wherein:
   the first wireless transceiver circuitry services a first communication frequency band; and
   the second wireless transceiver circuitry services a second communication frequency band.

7. The wireless communication device of claim 1, wherein:
   the first wireless transceiver circuitry supports a first communication interface protocol; and
   the second wireless transceiver circuitry supports a second communication interface protocol.

8. A wireless communication device comprising:
first wireless transceiver circuitry;
first diversity switch circuitry coupled to the first wireless transceiver circuitry and operable to control at least one coupled antenna;
second wireless transceiver circuitry;
second diversity switch circuitry coupled to the second wireless transceiver circuitry and operable to control at least one coupled antenna;
wireless interface device circuitry coupled to the first wireless transceiver circuitry, to the second wireless transceiver circuitry, to the first diversity switch circuitry, and to the second diversity switch circuitry, the wireless interface device circuitry servicing both the first wireless transceiver circuitry and the second wireless transceiver circuitry, the servicing including producing combined control signals for the first diversity switch circuitry and the second diversity switch circuitry; and
combined control signal routing circuitry coupled to the wireless interface device circuitry, the first diversity switch circuitry, and the second diversity switch circuitry, the combined control signal routing circuitry controlled by the wireless interface device circuitry to selectively route the combined control signals to the first diversity switch circuitry and to the second diversity switch circuitry;
wherein
the combined control signal routing circuitry performs a first routing of the combined control signal to the first diversity switch circuitry and to the second diversity switch circuitry in a first operating condition;
the combined control signal routing circuitry performs a second routing of the combined control signal to the first diversity switch circuitry and to the second diversity switch circuitry in a second operating condition; and
the first operating condition differs from the second operating condition.

9. The wireless communication device of claim 8, further comprising the combined control signal routing circuitry controlled by the wireless interface device to route the combined control signals to both the first diversity switch circuitry and to the second diversity switch circuitry during a third operating condition.

10. The wireless communication device of claim 8, further comprising:
the wireless interface device circuitry producing combined control signals for the first wireless transceiver circuitry and the second wireless transceiver circuitry; and
the combined control signal routing circuitry controlled by the wireless interface device circuitry to route the combined control signals to the first wireless transceiver circuitry in a one operating condition and to route the combined control signals to the second wireless transceiver circuitry in another operating condition.

11. The wireless communication device of claim 8, further comprising:
first and second antennas coupled to the first antenna diversity circuitry; and
the combined control signal routing circuitry controlled by the wireless interface device circuitry to route diversity switching control signals to the first antenna diversity circuitry to initiate diversity in the transmission or receipt of wireless communications serviced by the first wireless transceiver circuitry.

12. The wireless communication device of claim 11, further comprising:
third and fourth antennas coupled to the second antenna diversity circuitry; and
the combined control signal routing circuitry controlled by the wireless interface device circuitry to route diversity switching control signals to the second antenna diversity circuitry to initiate diversity in the transmission or receipt of wireless communications serviced by the second wireless transceiver circuitry.

13. The wireless communication device of claim 8, wherein:
the first wireless transceiver circuitry services a first communication frequency band; and
the second wireless transceiver circuitry services a second communication frequency band.

14. The wireless communication device of claim 8, wherein:
the first wireless transceiver circuitry supports a first communication interface protocol; and
the second wireless transceiver circuitry supports a second communication interface protocol.

15. A method for operating a wireless communication device having first wireless transceiver circuitry, second wireless transceiver circuitry, wireless interface device circuitry, and combined control signal routing circuitry, the method comprising:
the wireless interface device circuitry servicing both the first wireless transceiver circuitry and the second wireless transceiver circuitry, the servicing including producing combined control signals for the first wireless transceiver circuitry and the second wireless transceiver circuitry;
the combined control signal routing circuitry performing a first routing of the combined control signals to the first wireless transceiver circuitry in a first operating condition based upon input received from the wireless interface device circuitry; and
the combined control signal routing circuitry performing a second routing of the combined control signals to the second wireless transceiver circuitry in a second operating condition based upon input received from the wireless interface device circuitry;
wherein the first operating condition differs from the second operating condition.

16. The method of claim 15, further comprising the combined control signal routing circuitry routing the combined control signals to both the first wireless transceiver circuitry and to the second wireless transceiver circuitry during a third operating condition based upon input received from the wireless interface device circuitry.

17. The method of claim 16, wherein:
the first operating condition comprises the first wireless transceiver circuitry servicing communications and the second wireless transceiver circuitry idle;
the second operating condition comprises the second wireless transceiver circuitry servicing communications and the first wireless transceiver circuitry idle; and
the third operating condition comprises the first wireless transceiver circuitry and the second wireless transceiver circuitry simultaneously servicing communications.

18. The method of claim 15, further comprising:
the first wireless transceiver circuitry servicing a first communication frequency band; and
the second wireless transceiver circuitry servicing a second communication frequency band.

19. The method of claim 15, further comprising:
the first wireless transceiver circuitry supporting a first communication interface protocol; and
the second wireless transceiver circuitry supporting a second communication interface protocol.

20. A method for operating a wireless communication device having first wireless transceiver circuitry, first diversity switch circuitry, second wireless transceiver circuitry, second diversity switch circuitry, wireless interface device circuitry, and combined control signal routing circuitry, the method comprising:
the wireless interface device circuitry servicing the first wireless transceiver circuitry and the second wireless transceiver circuitry, the servicing including producing combined control signals for the first diversity switch circuitry and the second diversity switch circuitry;
the combined control signal routing circuitry performing a first routing of the combined control signals to the first diversity switch circuitry in a first operating condition based upon input received from the wireless interface device circuitry; and
the combined control signal routing circuitry performing a second routing of the combined control signals to the second diversity switch circuitry in a second operating condition based upon input received from the wireless interface device circuitry;
wherein the first operating condition differs from the second operating condition.

21. The method of claim 20, further comprising the combined control signal routing circuitry routing the combined control signals to both the first diversity switch circuitry and to the second diversity switch circuitry during a third operating condition.

22. The method of claim 20, further comprising the combined control signal routing circuitry controlled by the wireless interface device circuitry routing diversity switching control signals to the first antenna diversity circuitry to initiate diversity in the transmission or receipt of wireless communications serviced by the first wireless transceiver circuitry.

23. The method of claim 22, further comprising the combined control signal routing circuitry controlled by the wireless interface device circuitry routing diversity switching control signals to the second antenna diversity circuitry to initiate diversity in the transmission or receipt of wireless communications serviced by the second wireless transceiver circuitry.

* * * * *